United States Patent [19]

Uremovich

[11] Patent Number: 4,954,267

[45] Date of Patent: Sep. 4, 1990

[54] HYDROCARBON RECLAIMER SYSTEM

[76] Inventor: Michael J. Uremovich, R.R. #2, Elwood Rd., Manhattan, Ill. 60442

[21] Appl. No.: 346,132

[22] Filed: May 2, 1989

[51] Int. Cl.$^5$ ............................................. B01D 37/02
[52] U.S. Cl. ................................. 210/771; 210/778; 210/791; 210/805; 208/177
[58] Field of Search ............... 210/778, 805, 771, 791, 210/806, 767, 196, 799; 208/177

[56] References Cited

U.S. PATENT DOCUMENTS

| | | | |
|---|---|---|---|
| 2,430,182 | 11/1947 | McGuire | 252/322 |
| 2,696,306 | 12/1954 | Gomory | 210/778 |
| 2,971,648 | 2/1961 | Lane et al. | 210/741 |
| 3,835,021 | 9/1974 | Lorenz | 208/13 |
| 4,260,489 | 4/1981 | Greig et al. | 210/771 |
| 4,310,422 | 1/1982 | Romey et al. | 210/769 |
| 4,687,584 | 8/1987 | Urbani | 210/769 |
| 4,774,002 | 9/1988 | Gutman et al. | 210/636 |
| 4,774,007 | 9/1988 | Gordon | 210/766 |

*Primary Examiner*—Peter Hruskoci
*Assistant Examiner*—Krisanne Shideler

*Attorney, Agent, or Firm*—Lee, Mann, Smith, McWilliams & Sweeney

[57] ABSTRACT

A process for separating water and hydrocarbon from the solids in a petroleum product tank sludge is water-free, solvent-free, conducted at ambient conditions, utilizes no pre-coating with a filter aid, and creates no hazardous environment for filtering finished product sludge, such as gasoline. The process comprises operating a first pump and pumping sludge to a mixing tank and agitating the mixture. Solids content is measured and a determined volume of filter aid is added. The filter aid and sludge are mixed by operation of a mixer assembly which co-acts with baffles in the tank to achieve homogeneity in the mixing tank. A second pump pumps the mixing sludge and filter aid through one of a plurality of alternately selectable sealed horizontal plate filter and recirculates the filtered liquid back through the mixing tank until a desired clarity is reached. The filtered liquid may be pumped to an oil/water separator and the filtrate, or cake, collected on the filter plates is dried, preferably by introduction of an inert gas, and removed to be be taken to a disposal site.

19 Claims, 2 Drawing Sheets

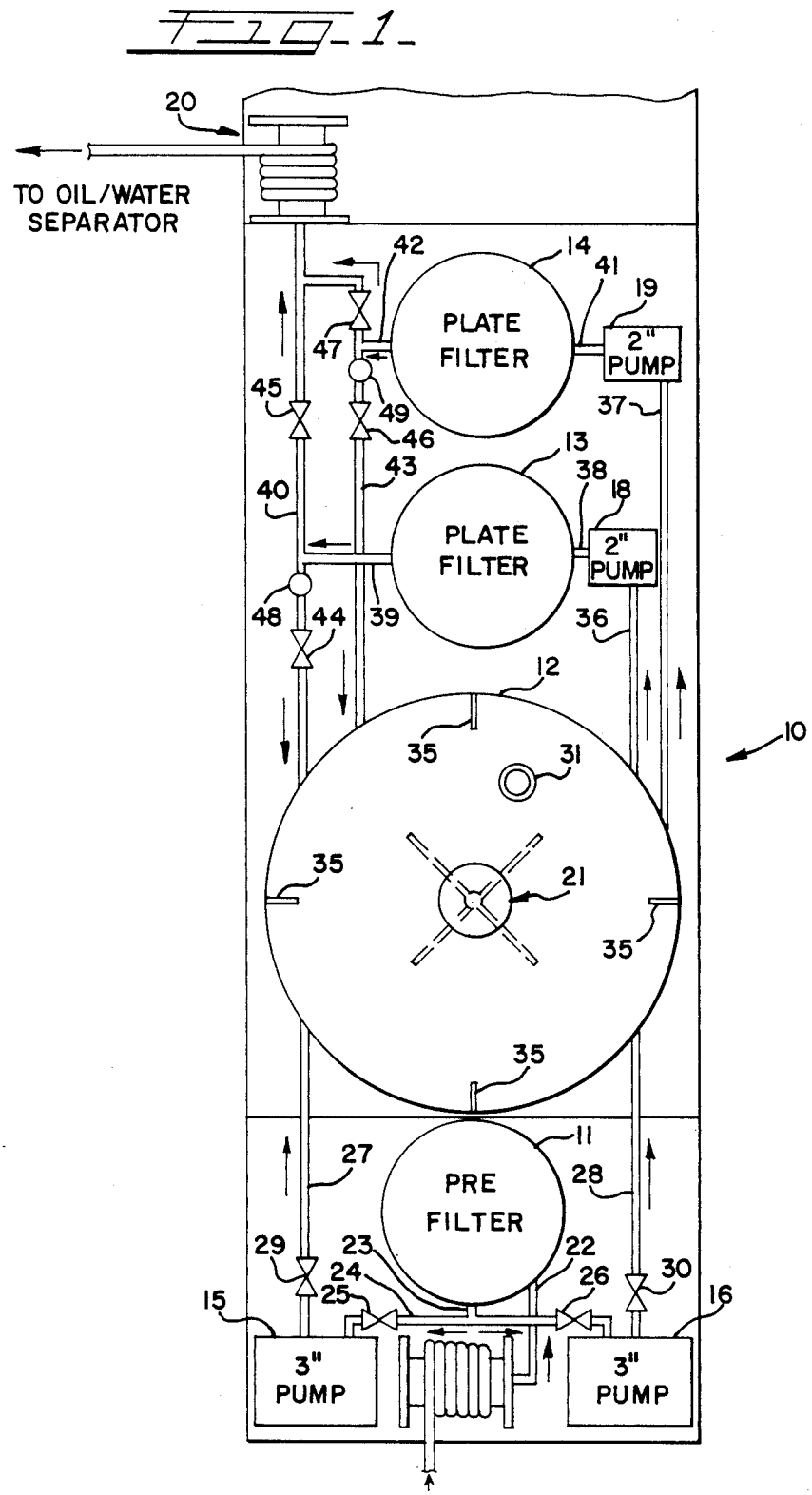

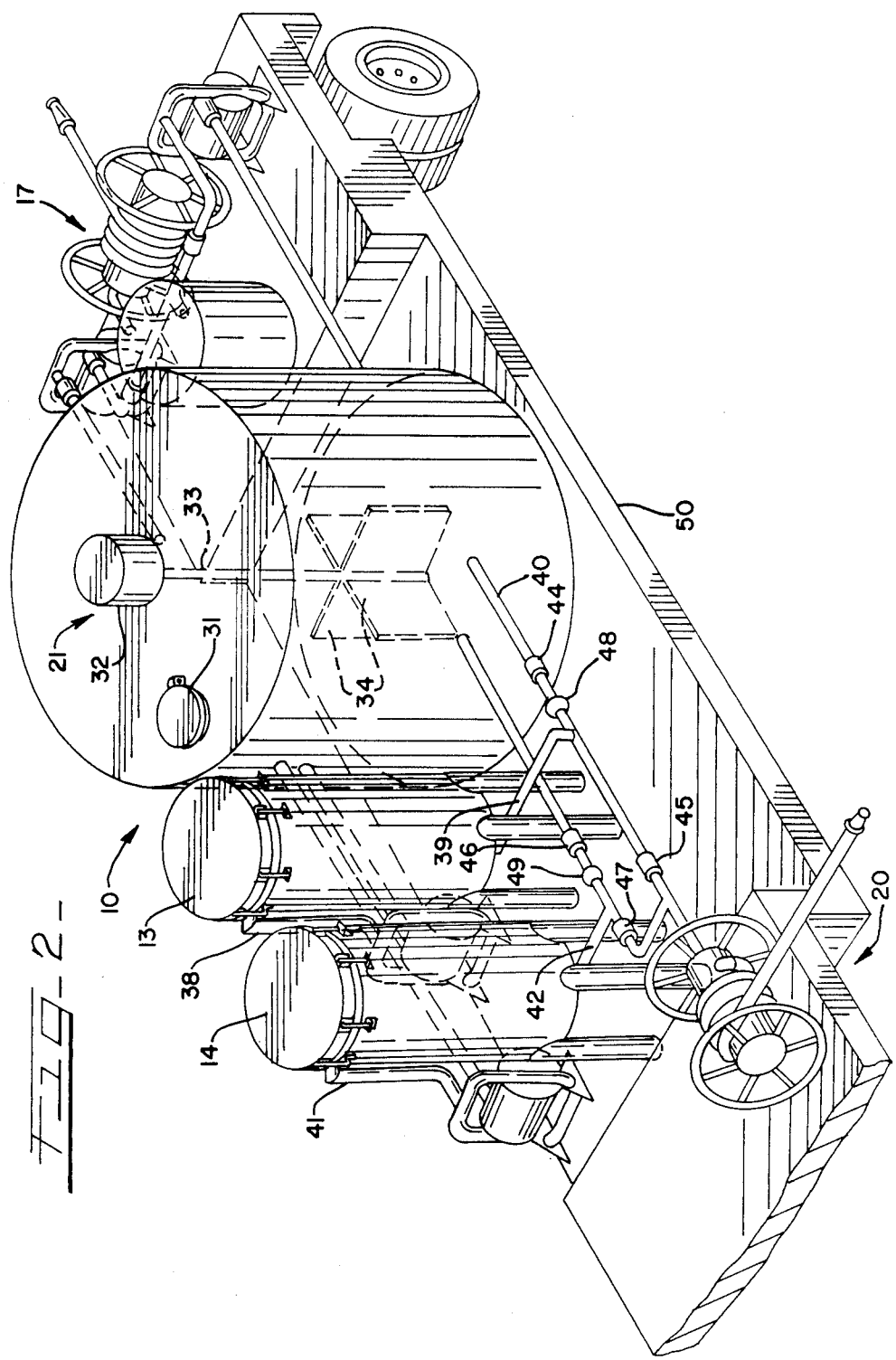

HYDROCARBON RECLAIMER SYSTEM

BACKGROUND AND SUMMARY OF THE INVENTION

The present invention is generally related to a system for separating suspended solids from hydrocarbons and water found in the bottoms of petroleum tanks as sludge. The invention is more particularly directed to separating the solids as a dry non-hazardous filtrate whereby the hydrocarbons and water are extracted for treatment at a oil/water separator capable of stripping the hydrocarbons. The invention is most particularly directed to providing a system for hydrocarbon and solid separation wherein no additional water is used, therefore minimizing the volume of contaminated water to be treated to only that amount which is separated from the sludge in order to meet environmental guidelines and minimize treatment costs.

The invention provides a process for efficiently and safely filtering petroleum tank bottom sludge, especially those petroleum tanks for storage of so-called finished products, such as kerosene, diesel oil, gasoline or No. 2 fuel oil, rather than tanks holding heavy oil contaminated solids, particularly those formed as residue by-products from the treatment of oil contaminated water or crude petroleum tank sludge, wherein a first step of bulk separating in a gravity separator, settlement tank, or an API separator, is required. However, in treating finished products, a critical concern is the flashpoint of the particular petroleum product, which must be considered most importantly at the time that the filtered cake is dried for containerization. Hazards can arise in filtering finished product storage tank sludge due to the creation of a vaporous, explosive environment.

Historically, oil storage tanks were cleaned by simply depositing the sludge in a pit and covering it. This is obviously not an acceptable practice for protecting the environment. The most common ways of disposal are to haul the sludge for incineration off-site, transport it to a treatment plant, or dump it at a protected landfill site. Disposing of hydrocarbons without polluting is very costly. On the other hand, separating the hydrocarbons from the solids found in the sludge is advantageous to the extent that the hydrocarbons may be resold for other purposes. However, a process that is intended to perform the separation must be done efficiently and effectively in order to make the reclamation effort environmentally and economically worthwhile. If the hydrocarbons cannot be easily separated for sale as a by-product, there is more likelihood that the entire sludge material will be incinerated, or treated and disposed of, without thought of separating the hydrocarbons for resale.

The present invention provides for removing the hazardous waste from oil tank bottom sludge, so that it can therefore be classified as "special waste". This status would permit such material to be containerized and placed into a landfill under Environmental Protection Agency (EPA) guidelines. However, to be in this category, the water content must be low and no free liquid present. Therefore a dry cake must result from the process to bring the water content down to acceptable levels. The present invention is a significant improvement to existing methods that involve hauling away sludge for incineration or to alternate disposal sites. A 90% cost saving per unit gallon of sludge can be attained over these prior disposal techniques. Also, by achieving a dry cake filtrate, which meets EPA guidelines, disposal permits, such as are required for dumping in most landfills, are more quickly obtained due to the safe quality of the cake to be disposed.

Known filtering techniques also employ so-called filter aids for precoating a filter in order that clogging does not occur from the solids accumulating on filtering sieves or plates. Usually, these known techniques for filtering heavy oil sludge involve adding a diluent, or have a heating step required. These processes often require the infusion of additional water, solvents, or other materials, to the sludge to be filtered. Additionally, in prior art processes that utilize filter aids, clamped filter presses, and the like, have been employed without addressing the vaporization/explosion hazard found with low flashpoint products, such as gasoline sludge.

Solvent washes, water washes and other means for cleaning filters during hydrocarbon separating steps are known. Compressed air, and other gases, are forced through filters to dry the solids following the solvent wash in many methods also found in the art. In U.S. Pat. No. 4,260,489, a method for treating oily sludge is disclosed which comprises filtering the sludge through a plate, leaf-and-tube, or candle, filter, that is operated under pressure. A filter aid, which may be diatomaceous earth, fly ash, or powdered polymers, may be added to the sludge before filtration to ensure longer and improved filtration by increasing the porosity of the filter cake and reducing the differential pressure per unit cake thickness, while preventing the cake from blinding. A drying step utilizing cold or hot air after the filtration is also made. This process also includes the use of a solvent to remove the hydrocarbon from the heavy oil. A water mix for a precoating step is also provided. The more costly and environmentally undesirable use of a diluent is required for use with a precoated surface filter by treating the filtration residue with a light hydrocarbon solvent and/or steam stripping the extracted residue.

U.S. Pat. No. 3,835,021 provides for the disposal of refinery waste sludge by filtering the sludge through a filter press that is precoated with diatomaceous earth. The resulting filter cake is washed out with water. Similarly, U.S. Pat. No. 2,430,182 discloses a process for treating water/oil refinery waste sludge by means of filtering the sludge with a filter that is also precoated with diatomaceous earth.

U.S. Pat. No. 4,774,007 involves a process for cleaning an oil waste pit and removing the hydrocarbon-contaminated matter using a liquid return process to repeatedly supply a part of the recovered filtrate back to the contaminated waste until the waste is substantially contaminate-free. Processes for filtering a solid from a liquid are generally shown in U.S. Pat. Nos. 2,696,306 and 2,971,648 in which diatomaceous earth is added as a filter aid. Other conventional sludge filtration systems are shown in U.S. Pat. Nos. 4,774,022, 4,687,584 and 4,310,422. In U.S. Pat. No. 4,310,422, a filter cake, which builds up during the course of continuing filtration, and which is primarily composed of the filter aid, is dried by flushing with inert gas.

My present invention overcomes the problems and inefficient procedures known in the prior art and is primarily directed towards the hydrocarbon reclamation from petroleum storage tanks. The invention does not require heating of the sludge or the use of a diluent.

No additional water need be added to the sludge, which is an environmentally beneficial feature, since the resulting hydrocarbon/water mix will include the minimal amount of water that has to be treated or disposed. Moreover, because no solvent wash is required, another pollution concern is eliminated. The present invention also eliminates a precoating step for the filtering device and does not require monitoring or adding filter aid during filtering. The filter aid is preferably diatomaceous earth which is introduced without requiring it to be pre-mixed with a third medium. For treating the petroleum/finished product tank sludge, a sealed multiplate and paper immersion type filter is employed in my process whereby flashpoint hazards are substantially eliminated.

SUMMARY OF THE INVENTION

The invention involves a system and process for filtering tank sludge created by finished products of the type which involve greater flashpoint hazards than found in treating, for example, heavy oil, tar, pitch, coal extract, or coal oil type storage tank sludge. A pump extracts the bottom sludge from the storage tank and draws it through a pre-filter to a mixing tank. The sludge is agitated by an hydraulic powered mixer to reach an even consistency and then a sample is taken to measure the percentage of solids in order to determine the amount of filter aid, preferably diatomaceous earth (D.E.), to be added to each mixing tank batch. A calculated amount of the D.E. is added. The mixer continuously stirs the sludge and D.E. Baffles are arranged inside the mixing tank so that the agitating sludge and D. E. achieve homogeneity. Next, a smaller capacity pump pumps the mixing sludge and diatomaceous earth from the mixing tank to pass through a sealed horizontal plate filter whereafter the sludge is recirculated back through the mixing tank. Samples of the filtering sludge are periodically taken until the proper clarity is achieved. At that point a valve on a return line from the plate filter to the mixing tank is closed and a valve on a second line is opened for directing the filtered liquid to an oil/water separator until the mixing tank is emptied. An inert gas, such a nitrogen ($N_2$), is then pumped under pressure to enter the plate filter and dry the solid filter cake collected on the horizontal plates. The plate filter may then be opened, the plates removed, and dry cake on the plates scraped into a container for transport to a landfill or the like. During the scraping step, a second plate filter is provided for filtering a next batch of sludge introduced into the mixing tank. If after one mixing tank batch the first plate filter is not clogged and can continue to filter effectively, another batch of sludge may be introduced to the mixing tank, mixed with D.E., and the first plate filter may continue to be used until clogged. On the other hand, if during a filtering phase, the first plate filter becomes clogged, valves may be operated to direct the sludge to the second plate filter wherein continuous operation is obtained.

The mixing tank in one embodiment has a volume of about 2,000 to 2,500 gallons whereby the entire system may be made portable for transport on a flatbed truck. In that way, setup at an oil tank depot may be completed less than two hours, which is quite an advantage to storage tank owners. The system provides for continuous recirculation to guarantee the desired clarity for each batch, which is highly efficient. By the operation of a plurality of valves arranged throughout the system, individual pumps can be isolated and may be repaired and/or replaced without requiring the mixing tank and fluid line system to be drained.

BRIEF DESCRIPTION OF THE DRAWINGS

FIG. 1 is a schematic view generally showing in plan the components of the system for the hydrocarbon reclaimer process; and, FIG. 2 is a perspective view of the hydrocarbon reclaimer system and components therefor shown assembled in a transportable manner on a flatbed truck.

DETAILED DESCRIPTION OF THE INVENTION

The following specification will be made in reference to FIGS. 1 and 2 wherein like reference numerals refer to the same elements throughout.

The system is generally denoted by reference numeral 10 and includes, as the main operating components, a pre-filter 11, a mixing tank 12, at least two horizontal plate filters 13, 14, two 3-inch diaphragm pumps 15, 16, a hose reel 17, at least two 2-inch diaphragm pumps 18, 19, a hose reel 20, and a mixer assembly 21. The components are connected by a pipe line system, and controlled by valves for the purpose of directing the sludge and filter aid through the system.

In general, the sludge is first drawn through the hose reel 17 into the pre-filter 11, which screens out large material of about ⅜ inch size or more. Either diaphragm pump 15, 16 is alternately used to create suction in the pre-filter 11 to draw the sludge from an oil storage tank through the pre-filter 11 and then pumped into the mixing tank 12. The mixer assembly 21 is arranged to stir the sludge inside the mixing tank 12. After the agitation creates an even consistency in the sludge, a sample of the sludge is taken to determine the solid content and an appropriate ratio of D.E. is placed into the mixing tank 12. The mixer assembly 21 continues to operate and agitate the sludge and D.E. to create a generally homogeneous mix. Then, one of the 2-inch diaphragm pumps 18, 19 is activated and draws the sludge from the mixing tank 12 into its respective horizontal plate filter 13 or 14, which in the preferred embodiment are horizontal plate filters made by Sparkler Filters, Inc. of Conroe, Texas. The plate filters 13, 14 are sealed multi-plate and paper immersion type filters. The diaphragm pump 18 or 19 continuously circulates the sludge from the mixing tank 12 through the plate filter 13 or 14 back through the mixing tank 12. A sample is taken during the recirculation phase. If a desirable clarity is reached, the valve system is changed whereby the filtered liquid is directed from the plate filter 13 or 14 outwardly of the system via the hose reel 20. The filtered liquid comprises hydrocarbon and water. Solids are collected in the plate filters 13, 14. The refinery or oil storage tank facility receives the fluid conveyed through the hose reel 20 for later separation by means of an oil/water separator.

The valve arrangement and line flow of the system 10 now will be explained in detail. At startup, an air compressor of a conventional design (not shown) is operated for energizing the pumps, hydraulic mixer assembly 21, and for pressurizing the plate filter 13 or 14. Then, either of the diaphragm pumps 15 or 16 is turned on to create suction in the pre-filter 11 and draw sludge from the storage tank through the hose reel 17 into a line 22 that feeds the pre-filter 11. An outlet line 23 forms a tee connection to a line 24 that extends between the pumps 15 and 16. Valves 25 and 26 control passage through line 24 at opposite sides of the line 23. Thereby, either, or both, of the pumps 15 and 16 may operate to draw sludge through the pre-filter 11. Outlet lines 27 and 28 extend from the output sides of the pumps 15 and 16, respectively, and fluidly communicate with the mixing tank 12. Preferably, only one of the pumps 15, 16 is used for filling the mixing tank 12, so that the other is kept in reserve should a breakdown occur. Thus, in most cases only one valve 25 or 26 is open during operation. The lines 27, 28 have valves 29, 30, respectively, therealong. Thereby, if either pump 15, 16 needs to be repaired or replaced, the valve pair 25, 24 or 26, 30, respectively, may be closed. The other pump may then operate without interruption and the system 10 need not be drained in order to replace or fix a pump.

When the mixing tank 12 is filled, the pump 15 or 16 is shut down. A test tube sample of the sludge is taken from the mixing tank 12 when the sludge has been mixed and it is placed in a centrifuge and spun, usually for about three minutes. The sample is then tested to determine the percentage of solids. Knowing the percentage of solids is necessary in order to determine how much filter aid, D.E., must be added to each batch. After determining the solid content, the appropriate amount of D.E. is added to the mixing tank 12 through a sealable opening 31. In field experiments conducted by the inventor, it has been determined that a ratio of about 1.5 parts D.E. to 1.0 part solids is usually effective to provide good flow paths through the cake that collects within the horizontal plate filters 13, 14.

In the disclosed embodiment, the 2300 gallon tank 12 is mixed by operation of the mixer assembly 21 for about five minutes. As best viewed in FIG. 2, the mixer assembly 21 will be seen to comprise an hydraulic motor 32 which rotatingly drives a shaft 33 that has mixing paddles 34 on it for stirring the sludge. Agitation in the mixing tank 23 is enhanced by a plurality of baffles 35, which help to further agitate the stirring sludge and D.E. mixture. Then, a second test tube sample is taken and placed in a centrifuge to verify that the desired ratio of D.E. to solids has been obtained. If the ratio is correct, the filtration phase may begin.

When the correct D.E. to solids ratio is obtained, the filtering phase begins by either starting the pump 18 and drawing sludge from the tank 12 through an outlet line 36, or starting the pump 19 and drawing sludge from the tank 12 through an outlet line 37.

The pump 18 is cooperative with the plate filter 13 as one alternate in a plural system also comprising pump 19 that acts respectively in cooperation with the plate filter 14. Either of these dual combinations might be used so that the system 10 makes continuous operation possible. It will be seen that the pump 18 has an outlet line 38 that feeds to the plate filter 13. An outlet line 39 from the plate filter 13 joins in a tee connection to a line 40 for directing fluid either back to the mixing tank 12 or to the hose reel 20, as will be explained. The pump 19 has an outlet line 41 which feeds the plate filter 14. The plate filter 14 has an outlet line 42 which similarly joins a line 43 in a tee connection for directing fluid either to the mixing tank 12 or the hose reel 20.

The line 40 includes a pair of valves 44, 45 at either side of the connection to line 39, which may be selectively opened or closed to either direct fluid from the plate filter 13 to the tank 12 or to the hose reel 20. Similarly, line 43 is provided with valves 46, 47 at opposite sides of the tee connection to the line 42, which may be selectively opened or closed to direct the fluid from the plate filter 14 to either the mixing tank 12 or to the hose reel 20. When the plate filter 13 is being utilized as the filter, the valve 45 will be closed and the valve 44 will be open whereby the 2-inch diaphragm pump 18 recirculates the sludge through the mixing tank until the desired clarity is achieved. Alternately, if the plate filter 14 is in use, the valve 47 is closed and the valve 46 is opened so that the 2-inch pump 19 likewise recirculates the sludge through the mixing tank 12. For purposes of sampling the filtering sludge, the line 40 is provided with a tap-off valve 48 and the line 43 is provided with a tap-off valve 49 so that the liquid leaving the plate filter 13 or 14 may be tested for clarity. When the plate filter 13 is in operation, valves 46 and 47 are preferably closed. Likewise, when the plate filter 14 is in operation, the valves 44 and 45 are preferably closed. Thereby each plate filter 13, 14 operates in a separate loop in combination with the associated 2-inch pump 18, 19, respectively. It is possible to use both plate filters simultaneously as an optional method. As the filtering phase proceeds, solids collect in a cake on the plates. The sludge is filtered to comprise 95% to 100% water and hydrocarbons. The cake forming on the filter plates is comprised of the solid material found in the tank sludge, which might be silt, rust, carbon and other solids usually found in oil storage tanks. The plate filters 13, 14 in the preferred embodiment are pressure vessels having a design pressure value of about 60 p.s.i. and each includes 18 metal plates and 17 paper filters sandwiched therebetween. During the recirculating process the D.E. builds up on the horizontal plates but also creates a myriad of flow passages, or paths, so that the solids do not congest the flow and the sludge is thereby filtered in a non-clogging manner.

The Sparkler-brand filter of the preferred embodiment is provided with R-17 size nylon filter paper, which has a 17 micron sieving size and achieves a very desirable clarity that exceeds the usual filtering requirements of refineries for treatment by their hydrocarbon/water separators. The buildup of the layer of solids on the plates is the key to the filtration process. In the preferred embodiment, the 18 plates and 17 papers effectively reach complete filtration of a 2300 gallon batch to the desired clarity in about a 2-5 minute period of recirculation. 2% or less residual hydrocarbon content in the cake is easily achieved, and less than 1% is present in most cases, even in this relatively short period of recirculation. Thus, a "safe" solid for landfill burial is expeditiously obtained.

The test samples of the filtered liquid leaving the plate filter 13 or 14 are taken at tap-off valves 48 or 49, respectively. When the plate filter 13 is in use, and the desired clarity is reached in the outlet line 39, the valve 44 may be closed and the valve 45 opened. As a result, the 2-inch diaphragm pump 18 pumps the filtered hydrocarbon and water through the plate filter 13 outwardly of the system 10 via the line 40 to the hose reel 20 for conveyance to an oil/water separator, holding tank, etc. Alternately, when the plate filter 14 is being used, and the desired clarity is reached in the outlet lines 42, the valve 46 is closed and the valve 47 opened. Thereby, the 2-inch diaphragm pump 19 pumps the filtered hydrocarbon and water through the plate filter 14 outwardly of the system 10 via line 43, which tee-connects to line 40, to the hose reel 20. At an oil/water separator, the hydrocarbon is stripped off for resale and the water may be treated or discharged. By virtue of the system 10 introducing no additional water, an economic and environmentally sound system is provided by minimizing the amount of water to be treated to only that which was found in the tank sludge itself.

Prior to pumping the mixing tank 12 empty, the flow rate through outlet line 39 or 42 can be inspected to determine how much clogging is occurring on the plates of the plate filter 13 or 14. As the volume of solids builds up on the plates, the flow rate will reach an undesirably slow rate and will ultimately become fully clogged. If the flow rate through the outlet line 39 or 42 is adequate after a batch, then the pump 18 or 19 is de-energized and either the pump 15 or 16 is started, whereby the next batch of sludge is introduced into the mixing tank 12 by again drawing sludge in through the hose reel 17 to line 22, through the pre-filter 11, and into outlet line 23. Depending on whether the pump 15 or 16 is being used, the sludge will be directed to the mixing tank 12 via line 27 or 28, respectively. The stirring of the sludge by the mixer assembly 21 takes place and the solids content then measured. The process thereby is repeated as explained above.

If after, or while, a batch is filtered, the flow rate through line 39 or 42 is below a desirable minimum due to the clogging buildup of cake on the filter plates, the plates must be removed and scraped clean. Prior to opening the filter 13 or 14, a gas, preferably inert, is forced under pressure through the filter plates to dry the cake. In the exemplary embodiment, the gas is introduced at about 50 psi to provide a good drying condition. The use of an inert gas, such as nitrogen ($N_2$), is desirable due to its enhanced drying capability. Because E.P.A. guidelines require dry material for landfill, drying with an inert gas is quite useful for achieving this goal. Compressed air is an alternate, but the risk of vaporization and explosion due to the flashpoint of a particular petroleum sludge usually dictates that an inert gas be used for safety reasons. Air is also less efficient in drying the cake due to moisture content.

During the drying step, moisture is forced out of the cake to the extent that there is at least no free liquid in it. The filter 13 or 14 is then depressurized, unsealed, and opened. The plates and paper are then removed. In the preferred embodiment, the Sparkler-brand plate filter has plates which are made of carbon steel that are stacked on top of each other. The plates are held together by nine tie rods. The R-17 filter paper is a white nylon reinforced material sandwiched between adjacent plates in a known way. To provide for a continuous filtering operation in the system 10, as soon as one of the plate filters 13 or 14 is rendered ineffective by clogging, the other one is put into use by energizing the associated pump 18 or 19, while shutting down the pump associated with the clogged plate filter. Following the switch over, the clogged filter then may be depressurized, the plates and filter paper removed, and the cake scraped into, for example, 55 gallon drums. When cleaned, the plates are ready to be reinserted into the plate filter, with new filter paper therebetween, ready for use after the other plate filter becomes clogged. Virtually uninterrupted filtering is thus made possible.

For alternating use of plate filter 13 and plate filter 14, the valves 44, 45 associated with plate filter 13, and the valves 46, 47 for plate 14, must be adjusted. Specifically, when plate filter 13 is in use, the valve 45 is closed and the valve 44 is open so that recirculation through line 40 into the mixing tank 12 and back through line 36 takes place. The open and closed positions are switched upon reaching the desired clarity whereby the line 40 then conveys the purified hydrocarbon and water to the hose reel 20. In this regard, valve 47 would be closed so that the flow is not otherwise directed into line 43. When the plate filter 14 is in use, the valve 47 is closed and the valve 46 is opened whereby the pump 19 recirculates the sludge through line 43, into the mixing tank 12 and back through line 37. Upon reaching the proper clarity, the open and closed positions are reversed and the pump 19 pumps the filtered hydrocarbon and water from outlet line 42 into line 43 and then to the hose reel 20. Similarly, the valve 45 along line 40 is closed so that the purified hydrocarbon and water is not inadvertently pumped through line 40 back toward the plate filter 13.

In making the switch from the plate filter 14 to the plate filter 13, the valves 46 and 47 are then closed. The valve 45 is kept closed and the valve 44 is opened as the pump 18 is activated for pumping the sludge to the plate filter 13. Of course, the valve 45 is opened and the valve 44 is closed when the filtered hydrocarbon and water are conveyed to the hose reel 20. At the end of a cycle using plate filter 13, and it is decided to switch to the plate filter 14, the valve 45 is closed, the valve 47 is kept in the closed position and the valve 43 opened so that the pump 19 may pump in a circulating manner through the plate filter 14 back through line 43 into the mixing tank 12 and back through line 37 as explained.

As subsequent sludge batches are drawn by the pump 15 or 16 through the hose reel 17 into the pre-filter 11 and next to the mixing tank 12, test samples are preferably taken for each batch to determine the appropriate amount of D.E. to add. The range of 1:1 to 2:1 D.E. to solids has been found to be acceptable for providing a satisfactory flow-through rate for the plate filters 13, 14. Usually the 1.5:1 ratio, as noted above, is optimally effective. The system 10 efficiently allows for easily changing the ratio from batch to batch.

A Sparkler-brand horizontal plate filter, or equivalent, can be used with various filter plate cartridges having different areas, weights, filter openings, etc. On average, at the point at which the plates start clogging, and are ready to be scraped clean, one can expect about one thousand pounds of cake to be collected for subsequent disposal. The use of an inert dry gas, such as nitrogen ($N_2$), forced through the cake is very beneficial due to the dessicating property of nitrogen which effectively picks up and attaches to the water molecules and drys the cake. In the preferred embodiment, a drying time of about five minutes achieves the desirable results. The system 10 is therefore quite useful to oil companies by virtue of the distinct advantage of processing only minimal amounts of water in their separator systems. Time is also reduced because there is no premixing of the sludge with water, a diluent, a solvent, or any third medium. The process requires no heating and may be conducted at ambient conditions. There is no pre-coating step, no need to clean with solvents, no water added to the sludge, and the system 10 may be effectively used to separate gasoline sludge, or other flammable fuel sludge, without worry of creating an explosive atmosphere.

The system 10 is also very efficient in the calculation of the amount of D.E. to solids to be added immediately before the initiation of the filtering, i.e. before the diaphragm pump 18 or 19 is operated, due to the homogeneity achieved by the mixing caused by the mixer assembly 21 in cooperation with the baffles 35. Thus the process does not require monitoring during filtering.

The functional characteristics of the sealed horizontal plate filters 13, 14 force every drop of sludge to pass through the filter paper and therefore causes very effective filtration. The plate filters 13, 14 operate under pressure and are tightly sealed to keep the sludge from squirting or seeping out, as can often occur with filter press-type devices which is especially undesirable when filtering flammables. The system 10 also efficiently recirculates the sludge wherein a sample may be taken at any point to determine clarity. Thereby, the system 10 can run until the desired clarity is achieved without requiring reloading, refiltering or any adjustment to the system. Prior art processes typically run material through a filter only once so that, if the filtrate is not of the desired clarity, or has not had all the solids removed, the semi-filtered batch must be re-loaded and run again. The inventive process and the system 10 therefore are highly efficient and overcome the re-running problems.

In the perspective view shown in FIG. 2, it will be seen that the system 10 may be provided in a size and arrangement whereby to be combined with a flatbed trailer allowing for portablity and quick setup time. As mentioned above, once arriving on a jobsite, the system 10 may be setup and ready to begin filtering in about two hours using a four man crew. Once operation begins, filtering may take place on a continuing basis. Travel to a distant tank is easily accomplished by simply disconnecting the hose reels 17 and 20 from the storage tank and oil water separator connections, respectively, and moving the flatbed trailer 50 where needed.

Of course a plurality of plate filters greater than the two employed in the exemplary embodiment can be used. Contrarily, only one plate filter might be provided, but the down time experienced due to the time needed to clean and replace filters may be undesirable. A way to avoid this delay with one plate filters is to provide two sets of interchangeable plates, so that a caked set can be removed and a clean set immediately inserted to minimize the shut down period. In yet another form of the invention, a plurality of mixing tanks may be used with a plurality of plate filters so that one may be filtering while another is being loaded with a sludge batch and tested for solid content ready to be subsequently filtered.

While the system 10 has been described with reference to an exemplary embodiment, it is considered that the inventive system and process encompass a wide variety of configurations and equivalents falling within the scope of the claims appended hereto.

What is claimed is:

1. A filtering process for filtering sludge from a finished product oil storage tank and thereby separating solids from oil and hydrocarbon, the process requiring no added water, solvents or diluents and comprising the steps of:
    pumping a volume sludge from a finished product oil storage tank to a mixing tank;
    mixing the sludge;
    sampling the sludge to determine solid content;
    adding filter aid comprising diatomaceous earth to the mixing tank;
    mixing the filter aid with the sludge in the mixing tank;
    enclosing and sealing a plurality of filter plates inside a horizontal plate filter;
    pressurizing said horizontal plate filter by operation of pump means;
    pumping the sludge from the mixing tank through the horizontal plate filter to filter out solids;
    recirculating the sludge from the horizontal plate filter back through the mixing tank; and,
    pumping a purified hydrocarbon and water filtrate from the horizontal plate filter.

2. A process as claimed in claim 1 further comprising pre-filtering the sludge prior to pumping it to the mixing tank.

3. A process as claimed in claim 1 further including the step of continuously mixing the sludge in the mixing tank during the step of pumping the sludge through the horizontal plate filter.

4. A process as in claim 1 further including pumping the mixing tank empty, stopping the pumping through the horizontal plate filter and cleaning off cake collected on the filter plates of the horizontal plate filter.

5. A process as in claim 4, wherein the cleaning step includes removing the plurality of filter plates from the horizontal plate filter.

6. A process as in claim 5 further including the step of inserting clean filter plates inside the horizontal plate filter.

7. A process as in claim 1, further including pumping the mixing tank empty and pumping a subsequent volume of sludge into the mixing tank.

8. A process as in claim 7, further including mixing the subsequent volume of sludge, sampling the sludge for solid content, mixing filter aid with the sludge and pumping the sludge to a second horizontal plate filter.

9. A process as in claim 1, further including the step of drying cake collected by the horizontal plate filter subsequent to pumping the the purified hydrocarbon and water filtrate from the horizontal plate filter.

10. A process as in claim 9, wherein the drying step comprises forcing an inert gas under pressure through the horizontal plate filter to dry cake collected on the filter plates.

11. A process as in claim 1 wherein a desired clarity is reached during the recirculating step in no greater than about five (5) minutes per 2300 gallon volume of sludge.

12. A hydrocarbon reclaimer process for treating oil storage tank sludge of the finished product-type comprising the steps of:
    operating a first pump to pump a volume of sludge from a finished product oil storage tank into a mixing tank;
    mixing the sludge in the mixing tank to be substantially homogeneous;
    determining the solid content of the mixed sludge;
    mixing filter aid with said sludge in the mixing tank;
    sealing a plurality of filter plates within a plate filter means;
    operating a second pump to pump the mixed filter aid and sludge from the mixing tank to the plate filter means and thereby pressurizing the plate filter means;
    recirculating filtering sludge through said plate filter means and the mixing tank wherein solids collect on the filter plates and a desired clarity is achieved in no greater than about five (5) minutes per 2300 gallon volume of sludge; and,
    directing a filtrate from the plate filter means containing no less than about 95% hydrocarbon and water.

13. A process as in claim 12, further including collecting solids in a cake on the filter plates of the plate filter means and drying said cake by means of introducing an inert gas under pressure into the plate filter means.

14. A process as in claim 13, further including unsealing the filter plate means, removing caked filter plates from said plate filter means and cleaning the cake from said filter plates.

15. A process as in claim 12, wherein the step of mixing the filter aid and sludge in the mixing tank comprises operating mechanical mixer means for agitating the filter aid and sludge within the mixing tank.

16. A process as in claim 12, further including after the step of directing filtrate from the plate filter means, the step of operating valve means to be capable of directing flow from the mixing tank to a second plate filter means.

17. A process as in claim 16, further including the step of operating said first pump to introduce a subsequent volume of sludge from an oil storage tank into the mixing tank.

18. A process as in claim 12, wherein the step of mixing filter aid comprises mixing diatomaceous earth.

19. A process as in claim 12, wherein the step of operating a pump to pump sludge from a finished product oil storage tank comprises pumping sludge from a gasoline, diesel oil, kerosene, or No. 2 fuel oil, oil storage tank.

* * * * *